US009287016B2

(12) United States Patent
Yamauchi et al.

(10) Patent No.: US 9,287,016 B2
(45) Date of Patent: Mar. 15, 2016

(54) REFLECTIVE SURFACE SHAPE CONTROLLABLE MIRROR DEVICE, AND METHOD FOR MANUFACTURING REFLECTIVE SURFACE SHAPE CONTROLLABLE MIRROR

(75) Inventors: Kazuto Yamauchi, Suita (JP); Takashi Kimura, Suita (JP); Takashi Tsumura, Kobe (JP)

(73) Assignees: JTEC CORPORATION, Kobe-shi (JP); OSAKA UNIVERSITY, Suita-shi (JP)

( * ) Notice: Subject to any disclaimer, the term of this patent is extended or adjusted under 35 U.S.C. 154(b) by 731 days.

(21) Appl. No.: 13/519,175

(22) PCT Filed: Dec. 28, 2010

(86) PCT No.: PCT/JP2010/073716
§ 371 (c)(1),
(2), (4) Date: Sep. 24, 2012

(87) PCT Pub. No.: WO2011/081182
PCT Pub. Date: Jul. 7, 2011

(65) Prior Publication Data

US 2013/0010929 A1 Jan. 10, 2013

(30) Foreign Application Priority Data

Dec. 28, 2009 (JP) ................................ 2009-297734

(51) Int. Cl.
*G02B 26/08* (2006.01)
*G21K 1/06* (2006.01)

(52) U.S. Cl.
CPC ............ *G21K 1/06* (2013.01); *G21K 2201/064* (2013.01); *G21K 2201/067* (2013.01); *Y10T 29/42* (2015.01)

(58) Field of Classification Search
CPC .......... G02B 6/00; G02B 6/06; G02B 6/0816; G02B 6/0825; G02B 6/0833; G02B 6/0841; G02B 6/085; G02B 6/0858; G21K 1/06
USPC ............ 378/145, 204, 210; 359/223.1, 224.1, 359/224.2, 846, 849
See application file for complete search history.

(56) References Cited

U.S. PATENT DOCUMENTS 7,359,106 B1 * 4/2008 Amm et al. .................. 359/291
2005/0162762 A1 * 7/2005 Novak .................. G02B 26/06 359/849

(Continued)

FOREIGN PATENT DOCUMENTS

EP 2063434 A1 * 5/2009 ........... G02B 5/0891
JP 2002-100551 A1 4/2002

(Continued)

OTHER PUBLICATIONS

Kimura et al , "Development of Adaptive Mirror for Wavefront Correction of Hard X-Ray Nanobeam", Advances in X-ray/EUV Optics and Components III, Proc. of SPIE vol. 7077,707709 (2008).*
International Search Report for International Application No. PCT/JP2010/073716 dated Mar. 8, 2011.

*Primary Examiner* — Robert Kim
*Assistant Examiner* — Davod E Smith
(74) *Attorney, Agent, or Firm* — Kratz, Quintos & Hanson, LLP

(57) ABSTRACT

The device is configured from: a reflective surface shape controllable mirror in which a band-shaped X-ray reflective surface 2 is formed on a central portion of a front surface of a substrate 1, reference planes 3 are formed along both sides of the X-ray reflective surface, and a plurality of piezoelectric elements 4 are attached to at least one of front and back surfaces of the substrate so as to be arranged in the longitudinal direction of the X-ray reflective surface on both side portions of the substrate, and a multichannel control system for applying a voltage to each of the piezoelectric elements.

5 Claims, 7 Drawing Sheets

(56) References Cited

U.S. PATENT DOCUMENTS

| | | | | |
|---|---|---|---|---|
| 2005/0237618 | A1 * | 10/2005 | Yamamoto | G02B 26/0825 359/587 |
| 2006/0239404 | A1 * | 10/2006 | Udpa | A61B 6/4021 378/62 |
| 2010/0012863 | A1 * | 1/2010 | Zacharias | G21K 1/06 250/505.1 |

FOREIGN PATENT DOCUMENTS

| | | | |
|---|---|---|---|
| JP | 2002-189193 | A1 | 7/2002 |
| JP | 2007-527030 | A1 | 9/2007 |
| JP | 2008-26294 | A1 | 2/2008 |
| JP | 2008-164553 | A1 | 7/2008 |
| JP | 2009-53055 | A1 | 3/2009 |
| WO | WO 2005/085931 | A1 | 9/2005 |

* cited by examiner (a)

(b)

REFLECTIVE SURFACE SHAPE CONTROLLABLE MIRROR DEVICE, AND METHOD FOR MANUFACTURING REFLECTIVE SURFACE SHAPE CONTROLLABLE MIRROR

TECHNICAL FIELD

The present invention relates to a reflective surface shape controllable mirror device and a method for manufacturing a reflective surface shape controllable mirror. More specifically, the present invention relates to a reflective surface shape controllable mirror device and a method for manufacturing a reflective surface shape controllable mirror for reflecting an X-ray beam in the soft and hard X-ray regions to thereby change a wavefront of the X-ray beam into an ideal wavefront.

BACKGROUND ART

It has become possible to utilize X-rays with high brightness, low emittance and high coherence in various wavelength ranges from soft X-rays to hard X-rays at 3rd-generation synchrotron radiation facilities represented by SPring-8. This resulted in a drastic improvement in sensitivity and spatial resolution of various analyses such as a fluorescent X-ray analysis, photoelectron spectroscopy, and X-ray diffraction. These X-ray analyses and X-ray microscopy utilizing a synchrotron radiation not merely provide high sensitivity and high resolution, but also make non-destructive observations possible, and are therefore currently being used in the fields of medicine, biology, material science, and the like.

In 3rd-generation synchrotron radiation facilities, 3.5th-generation synchrotron radiation facilities many of which are already under construction or in operation, or X-ray free electron laser facilities which are currently being under construction, a highly focused X-ray nanobeam is required in order to provide high spatial resolution with various analysis techniques utilizing an X-ray. A group of the inventors of the present invention has already succeeded in focusing a hard X-ray with a wavelength of 0.6 Å so as to have a focused beam diameter of 30 nm or less by using a light focusing optical system which is composed of a Kirkpatrick and Baez (K-B) mirror at the 1 km-long beam line of SPring-8. This success is due in large part to a high-precision mirror processing technique and high-precision mirror shape measuring techniques which have been uniquely developed. This processing technique refers to a numerically controlled elastic emission machining (EEM) a process principle of which is such that a high shear flow of ultrapure water mixed with fine particles is formed along a surface of a mirror to be processed, the fine particles are combined together with atoms on the surface of the mirror by a kind of chemical reaction, and the atoms on the surface are removed with movement of the fine particles. Further, the shape measuring techniques refer to a microstitching interferometry (MSI) and a relative angle determinable stitching interferometry (RADSI) a measurement principle of each of which is such that pieces of partial shape data taken by an interferometer which is capable of high precision shape measurement of small areas are put together to thereby obtain the entire shape data. The use of these shape measuring techniques makes it possible to measure the shape of an X-ray mirror with a high degree of accuracy in all spatial wavelength ranges with a measurement reproducibility of 1 nm or less (PV).

In order to achieve hard X-ray focusing with a smaller focused beam diameter and high energy from here on, it is necessary to manufacture a mirror having a large curvature and a shape with higher accuracy. Accordingly, it becomes essential to improve the performance of a shape measuring instrument. However, even if a shape measurement utilizing the above described nanometrology techniques (MSI and RADSI) is carried out with high accuracy and nanomachining (EEM) is performed based on the obtained shape data to thereby achieve nano-order accuracy in the shape of a reflective surface of a mirror, a wavelength of a reference light of the measuring instrument and a wavelength of an X-ray at the time of focusing generally differ significantly between when the shape of the focusing mirror is measured and when the mirror is actually used in an X-ray focusing device. In addition, the shape of the reflective surface is strained in a subtle way due to temperature or other installed environmental conditions, thereby affecting the focusing performance. In order to achieve the most ideal focusing at diffraction limit, it is necessary to know the shape of the reflective surface of the focusing mirror in a state of being incorporated in the X-ray focusing device with high accuracy. Therefore, the inventors have proposed an at-wavelength metrology in which a phase error in a mirror surface is calculated by phase retrieval calculation only from X-ray intensity profile information in a light focusing surface, and also proposed an X-ray focusing method in which a phase error of a light focusing optical system is corrected based on the phase error in the mirror surface calculated in the above metrology to thereby eliminate irregularities in a wavefront of a focal plane (Patent Document 1). Further, in order to accurately calculate a phase error of an X-ray mirror by the phase retrieval method, it is essential to acquire a precise focused X-ray beam intensity profile. The inventors have therefore proposed a new method for accurate measurement of an X-ray nanobeam intensity distribution that utilizes a dark-field method using a knife edge (Patent Document 2).

Further, in Patent Document 1, there has been proposed the use of a reflective surface shape controllable mirror having a wavefront adjustable function that enables a fine adjustment of a wavefront of an X-ray. Patent Document 1 discloses the specific structure of the reflective surface shape controllable mirror in which a mirror surface layer which has a reflective surface formed thereon and is elastically deformable is stacked on a base having high shape stability with a deformation drive layer therebetween. In the deformation drive layer, a common electrode layer is formed on one surface of a piezoelectric element layer and a plurality of divided drive electrode layers are formed on the other surface. A controlled voltage is applied between the common electrode layer and each of the drive electrode layers from driver means, a specific area of the sandwiched piezoelectric element layer is thereby deformed, and the deformation causes a change in the shape of the mirror surface layer.

Further, Patent Document 3 discloses a bimorph mirror which is capable of changing the surface shape. The bimorph mirror includes first and second layers of piezoelectric ceramic together with at least one electrode and serves to change at least one curvature of the mirror in response to at least one voltage applied to the piezoelectric ceramics. The first and second layers of piezoelectric ceramic are separated by a central core which forms a semirigid beam and is composed of a material such as glass or silica. Further, the first and second layers of piezoelectric ceramic are sandwiched between two skin layers which are composed of glass, silicon or the like, wherein at least one of the skin layers is for use as a mirror.

However, in bimorph type reflective surface shape controllable mirrors described in Patent Document 1 and Patent Document 3 mentioned above, since the thermal expansion coefficient of the piezoelectric element which is used for allowing the surface shape to be deformable is different from that of the material of the mirror (quartz, silicon, or the like), the mirror shape is sensitively distorted under the influence of a temperature difference. Generally, when manufacturing a nano-focusing K-B mirror, the surface shape nano-measurement (MSI and RADSI) and EEM are carried out by repetition in order to bring the mirror to completion. In this case, since EEM is performed in fluid, the surface shape is distorted due to a difference between the temperature at the time of measurement and the temperature at the time of machining. As a result, the distortion of the mirror generated between the measurement time and the machining time causes a big problem in achieving nm-order shape accuracy. For example, in the case of a bimorph mirror in which the material of the mirror is quartz and a piezoelectric element used therein is made of ceramic, since the mirror has a layered structure with materials having different thermal expansion coefficients, the surface shape varies by approximately 5 to 10 nm between 9 and 70 hours after EEM is performed on the mirror, as shown in FIG. 13. Further, it is impossible to actually match the temperature at the time of focusing operation to the temperature at the time of mirror machining. Therefore, even if the mirror is fabricated with nano-level shape accuracy, the surface shape of the mirror is distorted during a focusing operation due to a temperature difference, thereby causing a large shape error.

CITATION LIST

Patent Literatures

Patent Document 1: JP-A No. 2008-164553
Patent Document 2: JP-A No. 2009-053055
Patent Document 3: JP-T No. 2007-527030

SUMMARY OF INVENTION

Technical Problem

After consideration to realize a sub-10 nm hard X-ray nanobeam, it has been found that surface shape accuracy of at least 1 nm or less (PV) is required. It has also been found that the existing ultra-planarization base technique, namely, a method in which machining is performed so as to correct a shape error in a mirror surface which is measured by using an optical interferometer has a limited accuracy. Further, in order to realize a sub-10 nm hard X-ray nanobeam, a higher NA focusing mirror is required, which leads to a large incident angle of the mirror. Accordingly, a multilayer coating is required. However, in this case, a reflection phase error caused by thickness unevenness of the multilayer coating also needs to be less than 1 nm in terms of a shape error, which is an unignorable level from the viewpoint of the current level of coating technology.

In light of the foregoing circumstances, it is an object of the present invention to provide a reflective surface shape controllable mirror device which includes a reflective surface shape controllable mirror having a laminated structure formed from materials having different thermal expansion coefficients, the reflective surface shape controllable mirror device being capable of achieving nm-order shape accuracy by eliminating a machining error in the surface shape caused by distortion resulting from the temperature difference during the manufacture of the mirror and an error in the surface shape caused by distortion resulting from the conditions of the installation environment during a nano-focusing operation, and changing a wavefront of a reflected X-ray beam into an ideal wavefront by correcting the shape of the reflective surface or changing the focal length thereof. Further, it is also an object of the present invention to provide an X-ray focusing method using the reflective surface shape controllable mirror device, and a method for manufacturing the reflective surface shape controllable mirror.

Solution to Problem

In order to solve the above described problems, the present invention provides a reflective surface shape controllable mirror device for reflecting an X-ray beam in the soft and hard X-ray regions to thereby change a wavefront of the X-ray beam into an ideal wavefront. The reflective surface shape controllable mirror device includes a reflective surface shape controllable mirror in which a band-shaped X-ray reflective surface is formed on a central portion of a front surface of a substrate, reference planes are formed along both sides of the X-ray reflective surface, and a plurality of piezoelectric elements are attached to at least one of front and back surfaces of the substrate so as to be arranged in the longitudinal direction of the X-ray reflective surface on both side portions of the substrate, and a multichannel control system for applying a voltage to each of the piezoelectric elements.

In this regard, it is preferred that the reflective surface shape controllable mirror be configured in such a manner that the piezoelectric elements are arranged in lines along lateral sides of the reference planes on the both side portions of the substrate.

Further, it is further preferred that the reflective surface shape controllable mirror be configured in such a manner that the piezoelectric elements are arranged in lines so as to be symmetric with respect to the X-ray reflective surface.

Furthermore, it is further preferred that the reflective surface shape controllable mirror be configured in such a manner that the piezoelectric elements are arranged in lines on both of the front and back surfaces of the substrate with the same arrangement pattern.

In addition, in order to solve the above described problems, the present invention provides an X-ray focusing method using the reflective surface shape controllable mirror device, the X-ray focusing method including: incorporating the reflective surface shape controllable mirror in which initial shape data of the X-ray reflective surface and the reference planes is obtained to calculate a relative shape difference therebetween in advance into an X-ray focusing optical system; monitoring the shapes of the reference planes of the reflective surface shape controllable mirror in the incorporated state; calculating a phase error of the X-ray focusing optical system by a phase retrieval method based on an intensity distribution of an X-ray profile measured in an X-ray focusing area; and applying a voltage to each of the piezoelectric elements of the reflective surface shape controllable mirror from the control system so as to eliminate the phase error to thereby change the shape of the X-ray reflective surface.

Further, the present invention also provides a method for manufacturing a reflective surface shape controllable mirror for reflecting an X-ray beam in the soft and hard X-ray regions to thereby change a wavefront of the X-ray beam into an ideal wavefront, the method including: machining a band-shaped X-ray reflective surface on a central portion of a front surface of a substrate and reference planes along both sides of the X-ray reflective surface with a desired accuracy; and thereafter attaching a plurality of piezoelectric elements to at least one of front and back surfaces of the substrate so as to be arranged in the longitudinal direction of the X-ray reflective surface on both side portions of the substrate.

Also in this reflective surface shape controllable mirror manufacturing method, it is preferred that the piezoelectric elements be arranged in lines along lateral sides of the reference planes on the both side portions of the substrate, the piezoelectric elements be arranged in lines so as to be symmetric with respect to the X-ray reflective surface, or the piezoelectric elements be arranged in lines on both of the front and back surfaces of the substrate with the same arrangement pattern.

Advantageous Effects of Invention

According to the reflective surface shape controllable mirror device of the present invention, since the device is provided for reflecting an X-ray beam in the soft and hard X-ray regions to thereby change a wavefront of the X-ray beam into an ideal wavefront, and includes a reflective surface shape controllable mirror in which a band-shaped X-ray reflective surface is formed on a central portion of a front surface of a substrate, reference planes are formed along both sides of the X-ray reflective surface, and a plurality of piezoelectric elements are attached to at least one of front and back surfaces of the substrate so as to be arranged in the longitudinal direction of the X-ray reflective surface on both side portions of the substrate, and a multichannel control system for applying a voltage to each of the piezoelectric elements, the device produces the following distinguished effect.

In a reflective surface shape controllable mirror device which includes a reflective surface shape controllable mirror having a laminated structure formed from materials having different thermal expansion coefficients, even if the mirror is manufactured with a surface shape accuracy of 1 nm (PV), the shape of a reflective surface of the mirror is changed at the time of actual nano-focusing operation due to distortion of the entire mirror caused by the temperature difference and the conditions of the installation environment. However, since the reference planes are formed along both sides of the X-ray reflective surface in the present invention, by obtaining the initial shape data of the X-ray reflective surface and the reference planes and calculating the relative shape difference therebetween in advance, it becomes possible to restore the shape of the X-ray reflective surface to the initial shape at the time of initial machining by measuring the shapes of the reference planes after being deformed and applying a predetermined voltage to each of piezoelectric elements so that the shapes of the reference planes are restored to the shapes before being deformed. Further, making a database of voltage which is applied to each of the piezoelectric elements and the deformation amount of the X-ray reflective surface and the reference planes under different temperatures makes it possible to change the shape of the X-ray reflective surface into any shape though a spatial wavelength which is adjustable depending on the arrangement interval of the piezoelectric elements is limited. In addition, making a database of a pattern of voltage which is applied to each of the piezoelectric elements for adjusting an arbitrary aspherical shape under different temperatures makes it possible to appropriately change the focal length. For example, a variable range of the focal length of the mirror can be brought to ±100%, that is, the focal length can be changed so as to be in the range of 50 to 200 mm when a standard focal length is 100 mm.

A shape measurement of a planar shape can be easily performed over a wide area with high accuracy when compared to a shape measurement of an aspherical shape. Even if the reference plane is deformed, the deformed shape is still close to a planar shape. Therefore, it is possible to easily measure the shapes of the reference planes over a wide area with high accuracy with a Fizeau interferometer. Further, it is also possible to measure the shapes of the reference planes in a state where the mirror remains incorporated into the X-ray optical system. Furthermore, it is also possible to deform the X-ray reflective surface while monitoring the shapes of the reference planes.

Further, since the X-ray focusing method of the present invention includes: incorporating the reflective surface shape controllable mirror in which initial shape data of the X-ray reflective surface and the reference planes is obtained to calculate a relative shape difference therebetween in advance into an X-ray focusing optical system; monitoring the shapes of the reference planes of the reflective surface shape controllable mirror in the incorporated state; calculating a phase error of the X-ray focusing optical system by a phase retrieval method based on an intensity distribution of an X-ray profile measured in an X-ray focusing area; and applying a voltage to each of the piezoelectric elements of the reflective surface shape controllable mirror from the control system so as to eliminate the phase error to thereby change the shape of the X-ray reflective surface, it is possible to correct the shape of the reflective surface in approximately real time to thereby minimize the focused beam diameter in a state where the reflective surface shape controllable mirror remains incorporated into the X-ray focusing optical system.

According to the reflective surface shape controllable mirror manufacturing method of the present invention, since the method is provided for manufacturing a reflective surface shape controllable mirror for reflecting an X-ray beam in the soft and hard X-ray regions to thereby change a wavefront of the X-ray beam into an ideal wavefront, and includes: machining a band-shaped X-ray reflective surface on a central portion of a front surface of a substrate and reference planes along both sides of the X-ray reflective surface with a desired accuracy; and thereafter attaching a plurality of piezoelectric elements to at least one of front and back surfaces of the substrate so as to be arranged in the longitudinal direction of the X-ray reflective surface on both side portions of the substrate, the method produces the following distinguished effect.

In order to achieve nm-order shape accuracy in a reflective surface shape controllable mirror having a laminated structure formed from materials having different thermal expansion coefficients, distortion on the mirror surface caused by a difference between the temperature at the time of machining and the temperature at the time of shape measurement during the manufacture of the mirror has a large influence on a machining error. However, in the present invention, the X-ray reflective surface and the reference planes are previously machined on the mirror substrate in the state of single material with high accuracy before the piezoelectric elements are attached to the mirror substrate, and the piezoelectric elements are then attached to the mirror substrate so as to prevent generation of distortion on the mirror caused by the difference between the temperature at the time of machining and the temperature at the time of shape measurement during the manufacture of the mirror. Therefore, distortion caused by the temperature difference during the manufacture of the mirror is not generated.

Further, the change of the shape of the X-ray reflective surface caused by distortion which is generated when the piezoelectric elements are attached to the mirror substrate becomes predictable by measuring the shapes of the reference planes. Therefore, a shape error of the reflective surface is eliminated by applying a voltage to each of the piezoelectric elements so that the shapes of the reference planes are changed into planar shapes.

Although analysis using a smaller sample, or with higher spatial resolution or higher energy resolution has been currently available by virtue of a nano-focusing mirror, different types of experiments are limited to conduct with respective fixed optical systems. However, if a focal length changeable mirror for nano-focusing is put to practical use by the present invention, it will become possible to appropriately change optical systems according to types of experiments while maintaining nano-focusing ability, thereby making it possible to dramatically develop throughput of a variety of researches utilizing a synchrotron radiation. In addition, if it becomes possible to further freely control the surface shape accuracy by using a ultrahigh precision mirror with speckleless and nano-level surface shape accuracy and a surface roughness (RMS) of 0.2 nm or less, which is without parallel in the world, it is expected that this technology can be applied and expanded to industrial fields such as semiconductor and various optical fields other than synchrotron radiation facilities, thereby making it possible to not only improve the performance of existing products, but also create new technologies.

BRIEF DESCRIPTION OF DRAWINGS

FIG. 5(*a*) shows the shape before a voltage was applied to each of the piezoelectric elements. FIG. 5(*b*) shows the deformed shape after a predetermined voltage was applied to each of the piezoelectric elements.

DESCRIPTION OF EMBODIMENTS

Figure 1:
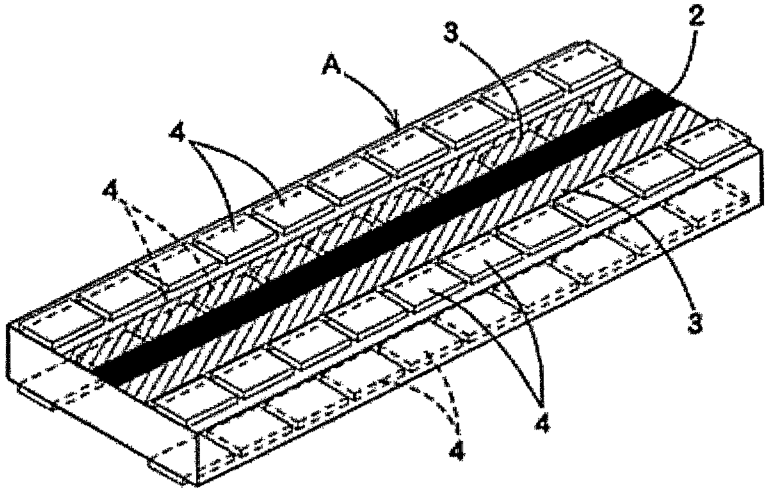
FIG. 1 is a perspective view showing a reflective surface shape controllable mirror according to the present invention.

Next, the present invention will further be described in detail based on embodiments shown in the appended drawings. FIGS. 1 to 4 show a reflective surface shape controllable mirror A according to the present invention. Reference signs 1, 2, 3 and 4 in these figures denote a substrate, an X-ray reflective surface, a reference plane and a piezoelectric element, respectively in this order.

The reflective surface shape controllable mirror A according to the present invention aims to reflect an X-ray beam in the soft and hard X-ray regions to thereby change a wavefront of the X-ray beam into an ideal wavefront. The reflective surface shape controllable mirror A has a structure in which a band-shaped X-ray reflective surface 2 is formed on a central portion of a front surface of a substrate 1, reference planes 3 are formed along both sides of the X-ray reflective surface 2, and a plurality of piezoelectric elements 4 are attached to at least one of front and back surfaces of the substrate 1 so as to be arranged in the longitudinal direction of the X-ray reflective surface 2 on both side portions of the substrate 1. Further, a reflective surface shape controllable mirror device of the present invention comprises the reflective surface shape controllable mirror A and a multichannel control system B for applying a voltage to each of the piezoelectric elements 4. The control system B applies a voltage to each of the piezoelectric elements 4 of the reflective surface shape controllable mirror A to thereby cause a change in the shape of the X-ray reflective surface 2.

Figure 2:
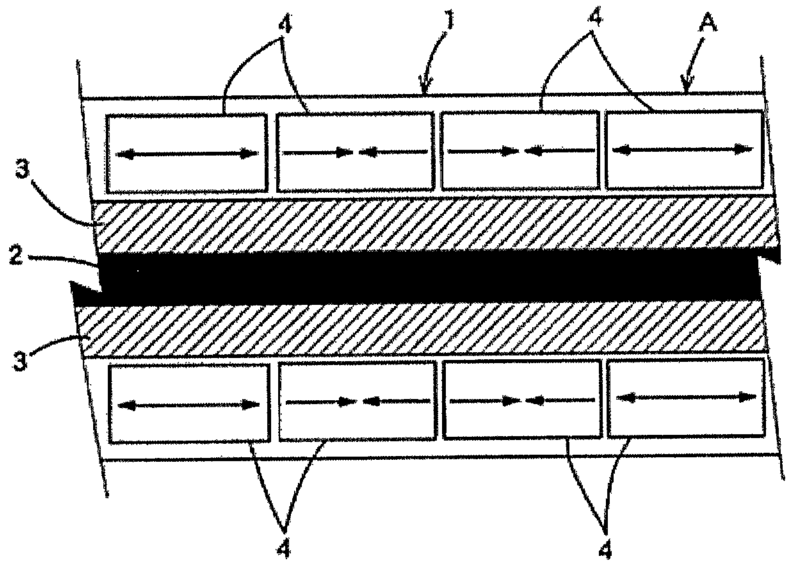
FIG. 2 is a partial plan view for explaining a principle of change in the shape of the reflective surface shape controllable mirror.
Figure 3:
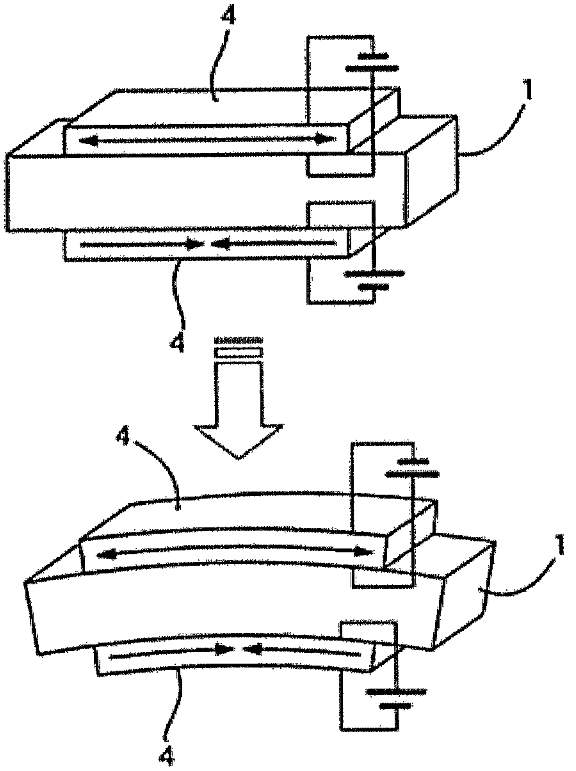
FIGS. 3(*a*) and 3(*b*) are partial plan views for explaining the principle of change in the shape of the reflective surface shape controllable mirror.

FIGS. 2 and 3 show a principle of change in the shape of the reflective surface shape controllable mirror A according to the present invention. FIGS. 3(*a*) and 3(*b*) are explanatory drawings each showing a partially cutaway view of FIG. 2. Firstly, the piezoelectric elements 4 are arranged so as to be symmetric with respect to the longitudinal direction of the X-ray reflective surface 2. Voltages are applied to each pair of the piezoelectric elements 4 located at symmetric positions on the same surface under the same deformation condition. On the other hand, voltages are applied to each pair of the piezoelectric elements 4 located at symmetric positions on opposite surfaces under the adverse deformation conditions to each other. In the piezoelectric elements 4 shown in the figures, an outward-pointing arrow denotes convex deformation or extensional deformation, and an inward-pointing arrow denotes concave deformation or shrinkage deformation. Accordingly, when a voltage is applied to the piezoelectric element 4 on the top surface so that the piezoelectric element 4 is convexly deformed, while at the same time a voltage is applied to the piezoelectric element 4 on the bottom surface so that the piezoelectric element 4 is concavely deformed as shown in FIG. 3(*a*), the mirror substrate 1 is convexly deformed upward as shown in FIG. 3(*b*). In this way, it is possible to change the surface shape of the mirror substrate 1, namely, the shapes of the X-ray reflective surface 2 and the reference planes 3 according to positive and negative, or the amount of the voltage applied to each of the piezoelectric elements 4.

More specifically, the mirror substrate 1 is made of single crystal silicon, quartz, or the like. Although the size of the mirror substrate 1 depends on characteristics of the X-ray optical system, the length of the X-ray reflective surface 2 is generally in the range of approximately 50 to 400 mm. Further, although the width and the thickness (the cross sectional shape) of the substrate 1 needs to be set so that the substrate 1 has a stiffness high enough to keep the amount of deformation caused by its own weight within an acceptable range, the stiffness also needs to be low enough to allow the substrate 1 to be deformed by the piezoelectric elements 4 which are attached to the surface thereof. The width of the X-ray reflective surface 2 and the width of each of the reference planes 3 are each approximately 5 mm. It is preferred that the piezoelectric elements 4 be attached to the surface of the substrate 1 with a certain space between the piezoelectric elements 4 so as not to interfere with each other. Further, the pitch of the piezoelectric elements 4 which are arranged in lines along the longitudinal direction of the X-ray reflective surface 2 is determined depending on a spatial wavelength at which the shape of the X-ray reflective surface 2 is changed. A request for this spatial wavelength is determined depending on how many periods of satellite peaks are eliminated, which varies in accordance with the wavelength of the X-ray, the length of the mirror, and the like. The order of the pitch of the piezoelectric elements 4 is in the range of approximately 10 to 50 mm.

The shape of the X-ray reflective surface 2 is set so that the wavefront of the X-ray which is reflected thereon is changed into an ideal wavefront. The shape of the X-ray reflective surface 2 is an ellipsoidal shape when the X-ray reflective surface 2 constitutes a K-B mirror, and is typically an aspherical concave shape. Further, when the reflective surface shape controllable mirror A of the present invention is used together with another focusing mirror in order to correct a shape error of the focusing mirror, the shape of the X-ray reflective surface 2 is a planar shape. In this case, it is not necessary to distinguish the X-ray reflective surface 2 from the reference planes 3, namely, not necessary to specially provide the reference planes 3.

Figure 13:
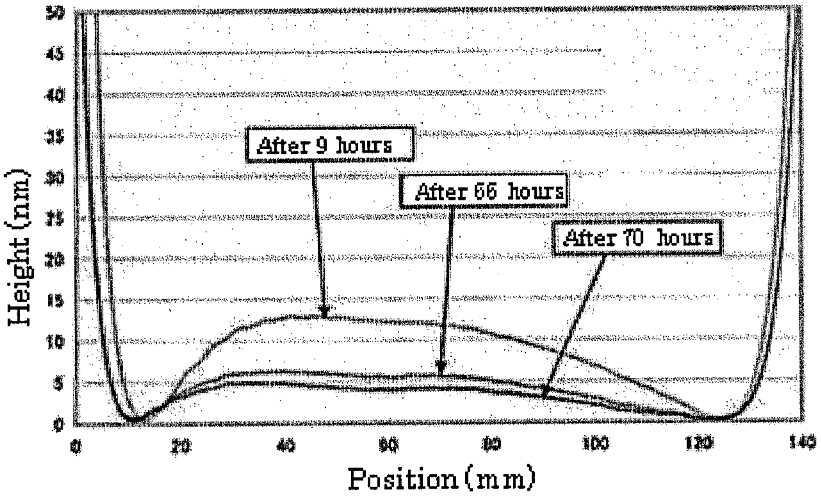
FIG. 13 is a graph showing with time a change in the shape of a bimorph type shape controllable minor after machining.

When the reflective surface shape controllable mirror A of the present invention is manufactured, there is used a method including: firstly machining the band-shaped X-ray reflective surface 2 on a central portion of a front surface of the substrate 1 and the reference planes 3 along both sides of the X-ray reflective surface 2 with a desired accuracy; and then attaching the plurality of piezoelectric elements 4 to at least one of front and back surfaces of the substrate 1 so as to be arranged in the longitudinal direction of the X-ray reflective surface 2 on both side portions of the substrate 2. This is because of the fact that if shape measurement and machining are performed on the X-ray reflective surface 2 and the reference planes 3 in a state where the piezoelectric elements 4 are previously attached to the mirror substrate 1, a reference shape is unstable due to a difference between the temperature at the time of the shape measurement and the temperature at the time of the machining, since the thermal expansion coefficients of the mirror substrate 1 and the piezoelectric element 4 are different from each other. The shape measurement and the machining are carried out in such a manner that the machining is performed by EEM, which is performed in fluid and employed as an ultraprecision machining, based on the measured shape data precisely measured by RADSI, the shape of the machined surface is then measured again, and the machining is then performed again if the already performed machining is insufficient. These processes are repeated until the surface shape becomes an acceptable shape. However, the reference shape is unstable due to a difference between the temperature at the time of the machining and the temperature at the time of the shape measurement, or temperature drift caused by passage of time. Therefore, it is impossible to achieve an accuracy of 1 nm or less (PV) which is a required accuracy for an X-ray reflective surface. As shown in FIG. 13, in a bimorph mirror, the deformation is settled 70 hours after the machining until which time the surface shape is changed by approximately 10 nm. Therefore, there is no point in performing the shape measurement in the process of the deformation. Since the machining is performed on the X-ray reflective surface 2 and the reference planes 3 before the piezoelectric elements 4 are attached to the mirror substrate 1 in the present invention, it is possible to maintain the machining accuracy.

The shapes of the X-ray reflective surface 2 and the reference planes 3 are precisely measured before the piezoelectric elements 4 are attached to the mirror substrate 1. These shapes and the relative shape difference therebetween are calculated to be obtained as initial shape data. Even if the X-ray reflective surface 2 and the reference planes 3 are deformed in some degree after the piezoelectric elements 4 are attached to the mirror substrate 1, the relative shape difference is almost unchanged. Therefore, by measuring the shapes of the reference planes 3 and then applying a voltage to each of the piezoelectric elements 4 so that the shapes of the reference planes 3 are restored to the shapes before being deformed, the shape of the X-ray reflective surface 2 can also be restored to the shape before being deformed. In this regard, it is also possible to use the shapes of the X-ray reflective surface 2 and the reference planes 3 and the relative shape difference therebetween after the piezoelectric elements 4 are attached to the mirror substrate 1 as the initial shape data.

Taking this one step further, making a database of a set of values of voltages which are applied to the respective piezoelectric elements 4 so that the shape of the X-ray reflective surface 2 is changed into a specific shape under different temperatures makes it possible to accurately change the shape of the X-ray reflective surface 2 into a desired shape, merely by applying a voltage of a predetermined voltage value set at an actual working temperature to each of the piezoelectric elements 4 without measuring the shape of the X-ray reflective surface 2. When the specific shape is an ellipsoidal shape corresponding to a plurality of focal lengths, the X-ray mirror can easily change the focal length. Accordingly, it is possible to change the focal length in a state where the reflective surface shape controllable mirror device of the present invention remains incorporated in the X-ray optical system without changing the alignment of the entire X-ray optical system, or only with fine adjustment. For example, if a variable range of the focal length of the mirror can be brought to ±100%, that is, if the focal length can be changed so as to be in the range of 50 to 200 mm when a standard focal length is 100 mm, the mirror can be utilized for various purposes.

Figure 4:
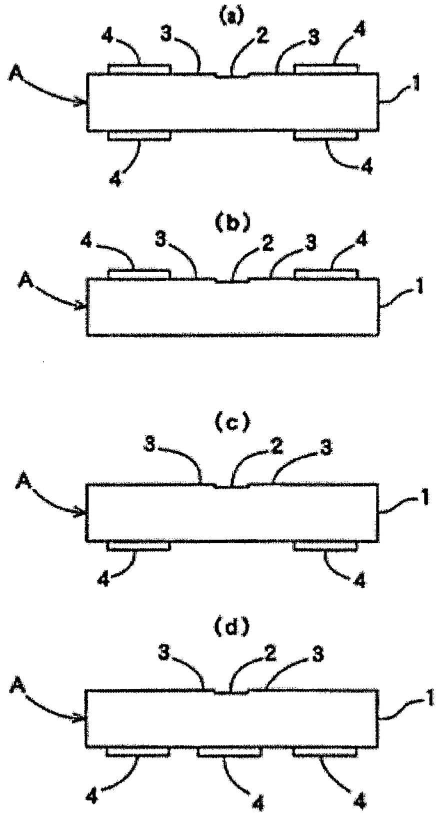
FIGS. 4(*a*), 4(*b*), 4(*c*) and 4(*d*) are side views showing arrangement patterns of piezoelectric elements on a mirror substrate.

FIG. 4 shows examples of the arrangement patterns of the piezoelectric elements 4 on the mirror substrate 1. It is important in deforming the X-ray reflective surface 2 without distortion to configure the reflective surface shape controllable mirror A in such a manner that the piezoelectric elements 4 are arranged in lines along lateral sides of the reference planes 3 so as to be symmetric with respect to the X-ray reflective surface 2 on both side portions of the substrate 1. In an arrangement pattern shown in FIG. 4(*a*), which is the same pattern as in the mirror shown in FIG. 1, the piezoelectric elements 4 are arranged in lines on both of the front and back surfaces of the substrate 1 with the same arrangement pattern. Even when the piezoelectric elements 4 are provided on only one of the surfaces of the substrate 1, it is possible to deform the substrate 1. In an arrangement pattern shown in FIG. 4(*b*), the piezoelectric elements 4 are arranged in lines on only both side portions of the front surface of the substrate 1, the front surface having the X-ray reflective surface 2. In an arrangement pattern shown in FIG. 4(*c*), the piezoelectric elements 4 are arranged in lines on only both side portions of the back surface of the substrate 1. In an arrangement pattern shown in FIG. 4(*d*), the piezoelectric elements 4 are further arranged in a line on a central portion of the back surface of the substrate 1, that is, a portion of the back surface corresponding to the position of the X-ray reflective surface 2 formed in the front surface, in addition to the piezoelectric elements 4 arranged as shown in FIG. 4(*c*).

Figure 5:
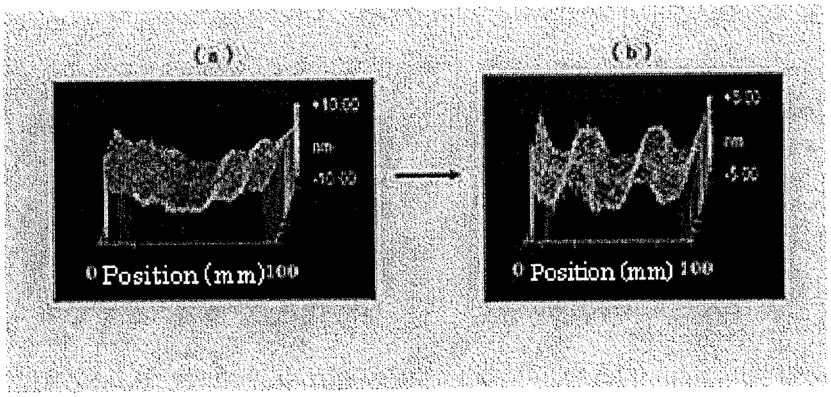
FIG. 5 shows a result of a measurement in which the shape of a reflective surface of a plane mirror including a plurality of piezoelectric elements attached to both side portions thereof was measured with a Fizeau interferometer.

FIG. 5(*a*) shows a result of a measurement which was carried out in such a manner that a plurality of piezoelectric elements were attached to both side portions of a plane mirror, and the shape of a reflective surface thereof was measured with a Fizeau interferometer (GPI-XR HR, manufactured by Zygo Corporation). FIG. 5(*b*) shows a result of a measurement in which the shape of the reflective surface was measured using the same interferometer as above after a predetermined voltage had been applied to each of the piezoelectric elements. As shown in these figures, it is possible to locally apply the moment to the mirror to thereby change the shape thereof by applying a voltage to each of the piezoelectric elements.

Figure 6:
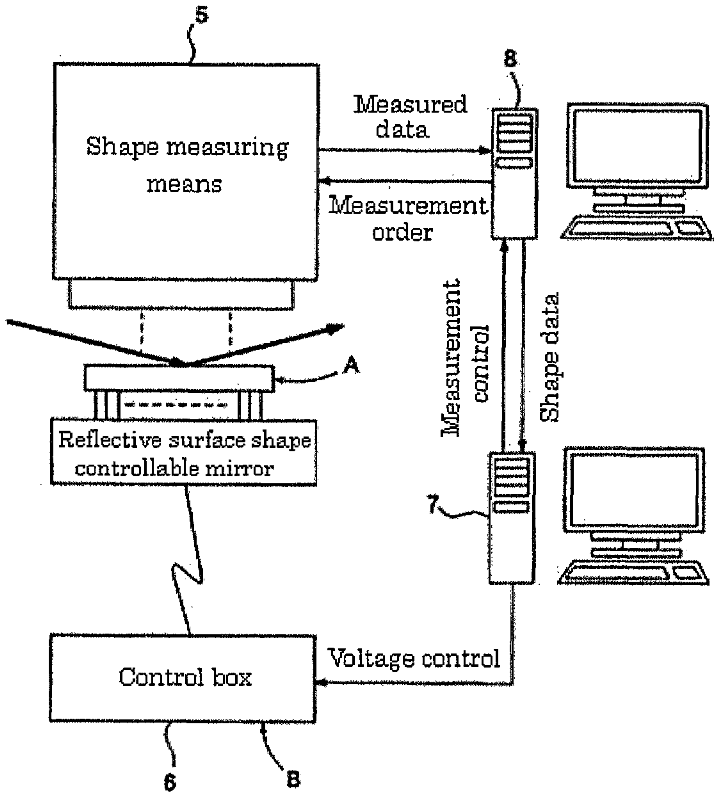
FIG. 6 is an explanatory drawing showing a feedback system for shape control which combines the reflective surface shape controllable mirror device of the present invention with shape measuring means.

In addition, in order to constantly stabilize the shape of the reflective surface shape controllable mirror A, a feedback system using shape measuring means 5 has been constructed as shown in FIG. 6. The control system B includes a multichannel control box 6 which applies a predetermined voltage to each of the piezoelectric elements 4 and a computer 7 which controls the control box 6. The shape measuring means 5 measures the shape of the reflective surface shape controllable mirror A in response to a measurement order from a computer 8. The computer 8 obtains the measured data and sends the measured data to the computer 7 of the control system B, thereby changing the shape of the reflective surface shape controllable mirror A. In this measurement, the Fizeau interferometer (GPI-XR HR, manufactured by Zygo Corporation) is used as the shape measuring means 5. Further, although the computer 7 of the control system B and the computer 8 for the shape measuring means 5 are independent devices to each other, and therefore separately described, it is also possible to use only one computer which serves as both of the computer 7 and the computer 8.

Figure 7:
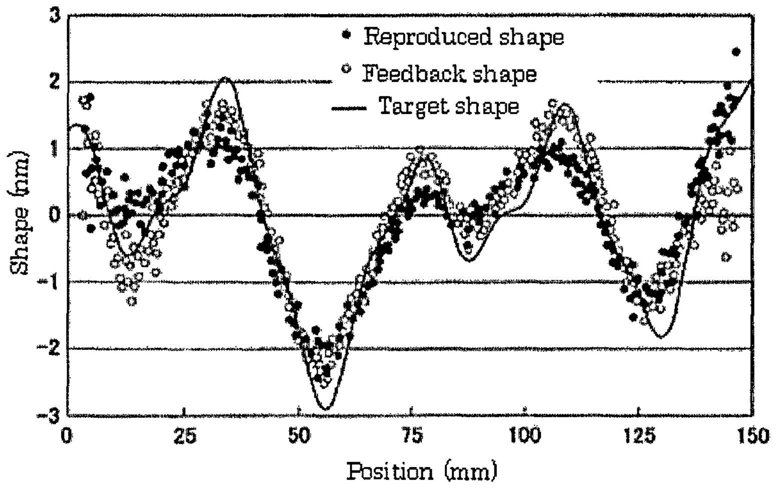
FIG. 7 is a graph showing a relationship between a target shape, a reproduced shape which was reproduced by applying a control voltage to each of the piezoelectric elements, and a feedback shape which was reproduced using the feedback system.

By the use of the feedback system in FIG. 6, an error between the shape of the mirror measured with the interferometer and a target deformed shape is obtained, a voltage which is necessary for deformation to be the target shape is calculated from the obtained error, and the calculated voltage is again applied to each of the piezoelectric elements. FIG. 7 shows a graph including a target shape, a reproduced shape which was obtained by applying a set of voltages obtained in advance by simulation to the piezoelectric elements, and a feedback shape which was obtained by applying modified voltages to the piezoelectric elements using the feedback system in FIG. 6. It is understood from the result of the deformation experiment of an arbitrarily shape with feedback that an error between the reproduced shape without feedback and the target shape is large. However, control of the mirror shape with subnanometer accuracy has been achieved by giving the feedback. Thus, it is possible to bring the mirror shape further closer to the target shape by the use of the feedback system.

Next, an X-ray focusing method for highly focusing an X-ray using the reflective surface shape controllable mirror device will be described. The X-ray focusing method of the present invention includes: incorporating the reflective surface shape controllable mirror A in which initial shape data of the X-ray reflective surface 2 and the reference planes 3 is obtained to calculate a relative shape difference therebetween in advance into an X-ray focusing optical system; monitoring the shapes of the reference planes 3 of the reflective surface shape controllable mirror A in the incorporated state; calculating a phase error of the X-ray focusing optical system by a phase retrieval method based on an intensity distribution of an X-ray profile measured in an X-ray focusing area; and applying a voltage to each of the piezoelectric elements 4 of the reflective surface shape controllable mirror A from the control system B so as to eliminate the phase error to thereby change the shape of the X-ray reflective surface 2.

Figure 8:
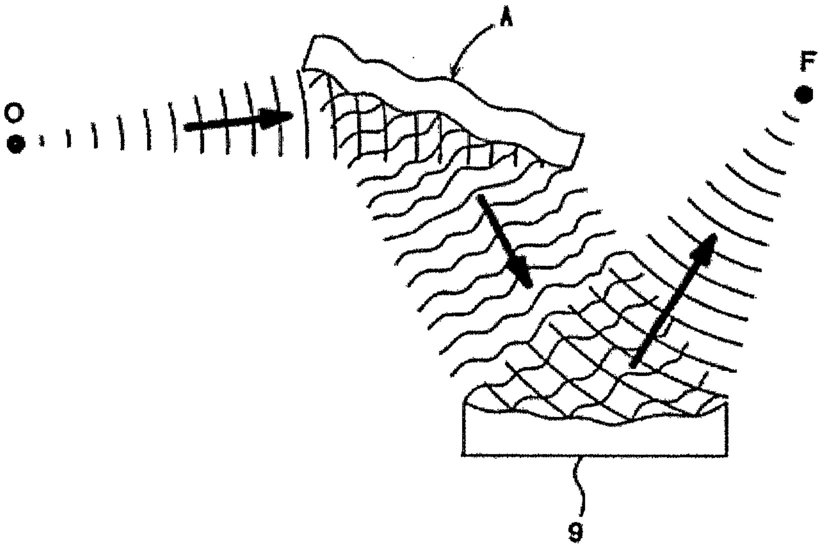
FIG. 8 is an explanatory drawing showing a method for correcting a wavefront error by placing a reflective surface shape controllable mirror having a planar X-ray reflective surface in a front side of an X-ray focusing mirror.

As shown in FIG. 8, the reflective surface shape controllable mirror A provided with the X-ray reflective surface 2 having a planar shape is placed in a front side of an X-ray focusing mirror 9. In the figure, "O" denotes an optical source and "F" denotes a focal point. The X-ray focusing mirror 9 is a multilayer mirror. For example, when the incident angle of an X-ray is set at 11.1 mrad, and the incident angle with respect to the X-ray reflective surface 2 of the reflective surface shape controllable mirror A is set at 3.26 mrad, a wavefront error of the X-ray caused by a surface shape error of 1 nm of the multilayer X-ray focusing mirror 9 is approximately the same as a wavefront error of the X-ray caused by a surface shape error of 3.4 nm of the X-ray reflective surface 2 of the reflective surface shape controllable mirror A. That is, since an acceptable range for the shape error of the X-ray reflective surface 2 of the reflective surface shape controllable mirror A is large, it is possible to perform wavefront modification with higher accuracy even with rather rough shape correction. Therefore, placing the reflective surface shape controllable mirror A in the front side of the X-ray focusing mirror 9 makes it possible to reduce the wavefront error as compared to the case when the X-ray focusing mirror 9 is used alone. In this regard, the shape error and the wavefront error of the mirror surface are synonymous. Further, it is possible to make the phase error correspond to the shape error.

Figure 9:
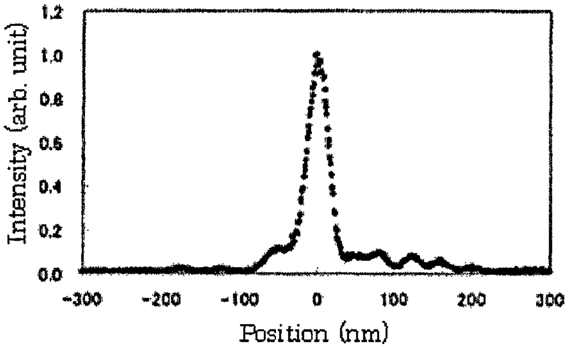
FIG. 9 is a graph showing an X-ray intensity distribution which was measured at a focal point.
Figure 10:
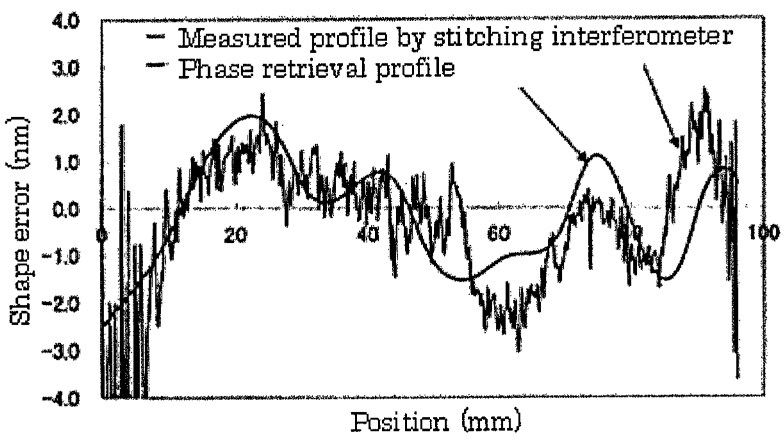
FIG. 10 is a graph showing a phase retrieval profile of an X-ray minor which was calculated only from the X-ray intensity distribution in FIG. 9 by a phase retrieval method and a measured profile of the X-ray mirror which was measured with a stitching interferometer (RADSI).

At first, an X-ray intensity distribution is measured in the vicinity of the focal point of the X-ray. Then, a phase error is calculated by a phase retrieval method. In the phase retrieval method, unmeasurable phase information is obtained from measurable intensity distribution information in a single light. Namely, in the case of a coherent X-ray such as a synchrotron radiation, a convergence calculation which repeatedly carries out a forward calculation (Fourier transformation and the like) and a backward calculation (inverse Fourier transformation and the like) is performed, thereby calculating a phase of the reflected X-ray on the mirror from the intensity distribution of the focused beam profile. FIG. 9 shows an example of a measurement of the focused X-ray beam profile in which the focused beam diameter is approximately 30 nm. A phase error was calculated by the phase retrieval method using this focused X-ray beam profile. The calculated phase error is shown as a shape error of the mirror surface in a graph of FIG. 10. In this case, the length of the mirror is 100 mm. In the graph of FIG. 10, the abscissa represents a position in the longitudinal direction of the mirror and the ordinate represents a shape error (nm) from an ideal shape. Further, FIG. 10 also shows a result of an off-line measurement of the shape of the mirror which was measured with a stitching interferometer (RADSI). It is known from the result that the wavefront shape error obtained based on the phase retrieval method is coincident with the shape data measured by the stitching interferometer at λ/10 level in terms of a phase error. Therefore, there is confirmed a good correspondence between the actually measured shape error of the mirror and the shape error calculated by the phase retrieval method, which means that the phase retrieval method can perform extremely excellent restoration of the mirror shape.

Figure 11:
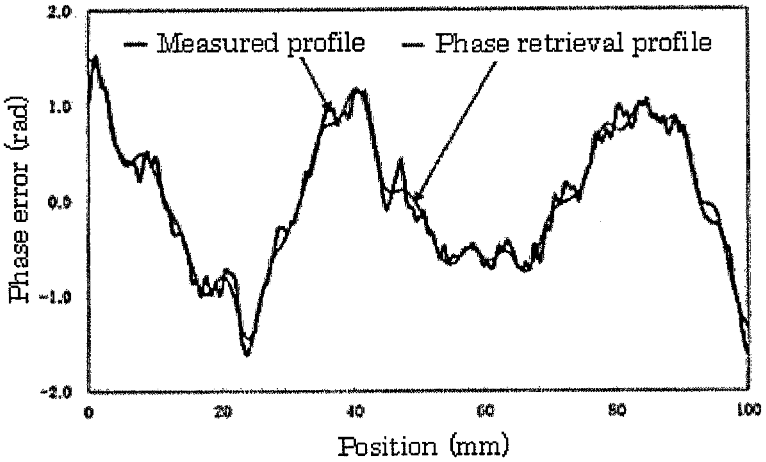
FIG. 11 is a graph showing a phase retrieval profile calculated by the phase retrieval method using an X-ray intensity distribution with high accuracy and a measured profile.

The focused X-ray beam profile in FIG. 9 uses the measurement result measured by a wire scanning method. However, when a focused X-ray beam profile with high accuracy which is measured by a precise measurement method of an X-ray nanobeam intensity distribution that uses a dark-field metrology using a knife edge described in Patent Document 2 is utilized, the reproducibility is further improved as shown in FIG. 11.

Figure 12:
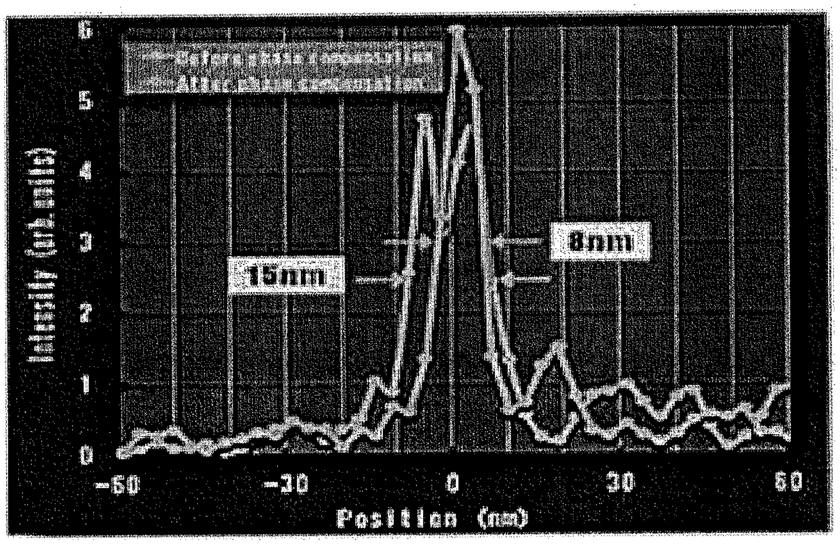
FIG. 12 is a graph showing focused beam profiles before and after the wavefront correction when an X-ray was focused by using the reflective surface shape controllable mirror and the X-ray focusing mirror.

In this way, a sub-10 nm hard X-ray focused beam has been realized by calculating a wavefront error caused by the focusing mirror from the measured X-ray intensity distribution of the X-ray focusing optical system by using the phase retrieval method, and then, correcting the obtained wavefront error with the reflective surface shape controllable mirror A. FIG. 12 shows focused beam profiles before and after correcting the wavefront which were measured on the above occasion. Before the wavefront correction, a line focus of 15 nm was obtained, and the focused beam profile was a distorted profile having two peaks. However, the high correction effect produced by the X-ray focusing method of the present invention has been confirmed. Specifically, a line focus of 8 nm which is better than a line focus of 10 nm set as a target has been achieved. In addition, the shape of the focused beam profile has also been improved. Thus, by changing the shape of the plane mirror placed in the front side of the focusing mirror with, for example, a 0.1 nm of height accuracy, it is possible to artificially allow the incident X-ray to have a phase distribution and cancel the phase error calculated by the at-wavelength wavefront measurement. As a result, it becomes possible to change the wavefront of the X-ray reflected on the X-ray focusing mirror so as to have an ideal wavefront shape. In this regard, when the X-ray focusing is performed using a K-B mirror, since two X-ray focusing mirrors are used, the reflective surface shape controllable mirror A for wavefront correction is also provided with respect to each of the X-ray focusing mirrors. Further, a principle of the X-ray focusing method using the phase retrieval method is specifically described in Patent Document 1.

INDUSTRIAL APPLICABILITY

It is expected that, if a sub-10 nm hard X-ray nanobeam can be put to practical use, functional imaging of materials with molecular size resolution, a structural analysis by using single molecule diffraction, and the like will become available. Further, it is also expected that, if further higher brightness and shorter pulse can be realized, an actual time measurement of chemical reactions and observation of live cells will also become available. The sub-10 nm hard X-ray nanobeam can be utilized in imaging of intracellular elements with a fluorescent X-ray using various cells and construction of a coherent X-ray diffraction microscope, for application of medicine and drug discovery.

REFERENCE SIGNS LIST

A Reflective surface shape controllable mirror
B Control system
1 Substrate
2 X-ray reflective surface
3 Reference plane
4 Piezoelectric element
5 Shape measuring means
6 Control box
7 Computer
8 Computer
9 X-ray focusing mirror

The invention claimed is:

1. A reflective surface shape controllable mirror device for reflecting an x-ray beam in the soft and hard x-ray regions to thereby change a wavefront of the x-ray beam into an ideal wavefront, the reflective surface shape controllable mirror device comprising:

A reflective surface shape controllable mirror; the mirror including

A substrate having a front surface and a back surface,

A band-shaped x-ray reflective surface formed on a central portion of the front surface of the substrate with desired accurate precision, Reference planes formed along both sides of the x-ray reflective surface with desired accurate precision, Wherein shapes of the x-ray reflective surface and the reference planes are measured, and wherein the shapes and relative shape difference therebetween are calculated to be obtained as initial shape data, A plurality of piezoelectric elements attached to the front surface or the back surface of the substrate in lines along lateral sides of the reference planes so as to be arranged in the longitudinal direction of the x-ray reflective surface on both side portions of the substrate so as to be symmetric with respect to the x-ray reflective surface, and A plurality of-piezoelectric elements attached to an opposite surface of the substrate in such manner that the piezoelectric elements are arranged in lines so as to be symmetric with respect to the x-ray reflective surface, and A multichannel control system for applying a voltage to each of the piezoelectric elements.

2. The reflective surface shape controllable minor device according to claim 1, wherein the reflective surface shape controllable minor is configured in such a manner that the piezoelectric elements are arranged in lines on both of the front surface and the back surface of the substrate with the same arrangement pattern.

3. An X-ray focusing method using the reflective surface shape controllable mirror device according to claim 1, the X-ray focusing method comprising:

incorporating the reflective surface shape controllable minor in which initial shape data of the X-ray reflective surface and the reference planes is obtained to calculate a relative shape difference therebetween in advance into an X-ray focusing optical system;

monitoring the shapes of the reference planes of the reflective surface shape controllable minor in the incorporated state;

calculating a phase error of the X-ray focusing optical system by a phase retrieval method based on an intensity distribution of an X-ray profile measured in an X-ray focusing area; and applying a voltage to each of the piezoelectric elements of the reflective surface shape controllable minor from the control system so as to eliminate the phase error to thereby change the shape of the X-ray reflective surface.

4. A method for manufacturing a reflective surface shape controllable mirror for reflecting an x-ray beam in the soft and hard x-ray regions to thereby change a wavefront of the x-ray beam into an ideal wavefront, the method comprising:

Machining a band-shaped x-ray surface formed on a central portion of a front surface of a substrate having a front surface and a back surface, and reference planes formed along both sides of the x-ray reflective surface with a desired accuracy, and Measuring shapes of the x-ray reflective surface and the reference planes, calculating the shapes and the reference shape difference therebetween, and obtaining the calculated shapes as initial shape data, and thereafter Attaching a plurality of piezoelectric elements to one of the front and back surfaces of the substrate in lines along lateral sides of the reference planes so as to be arranged in the longitudinal direction of the x-ray reflective surface on both side portions of the substrate, so as to be symmetric with respect to the x-ray reflective surface, and Attaching the piezoelectric elements to the opposite surface of the substrate in such manner that the piezoelectric elements are arranged in lines so as to be symmetric with respect to the x-ray reflective surface.

5. The method according to claim 4, wherein the piezoelectric elements are arranged in lines on both of the front and back surfaces of the substrate with the same arrangement pattern.

* * * * *